United States Patent [19]

Vandenberg

[11] Patent Number: 4,809,523
[45] Date of Patent: Mar. 7, 1989

[54] THERMAL COOLING AND HEAT TRANSFER SYSTEM

[76] Inventor: Leonard B. Vandenberg, 710 Sanders Ave., Scotia, N.Y. 12302

[21] Appl. No.: 611,197

[22] Filed: May 17, 1984

[51] Int. Cl.$^4$ .............................................. F25B 15/00
[52] U.S. Cl. ..................................... 62/483; 62/235.1; 62/500
[58] Field of Search ................. 62/235.1, 238.3, 238.4, 62/268, 496, 483, 481, 500; 126/427; 417/118

[56] References Cited

U.S. PATENT DOCUMENTS

| | | | |
|---|---|---|---|
| 4,173,994 | 11/1979 | Hiser | 126/427 |
| 4,224,925 | 9/1980 | Movick | 126/427 |
| 4,270,522 | 6/1981 | Vandenberg | 126/437 |
| 4,321,801 | 3/1982 | Collard | 62/268 |
| 4,490,993 | 1/1985 | Larriva | 62/304 |

FOREIGN PATENT DOCUMENTS 19446 2/1977 Japan ................................ 62/235.1

*Primary Examiner*—Henry A. Bennet
*Attorney, Agent, or Firm*—Darcy, Donovan & Coleman

[57] ABSTRACT

A fluid system for controlling fluid temperatures and transferring heat from a thermal energy source such as a solar collector to point-of-need heat exchangers, remote from the collector from which heat is discharged for use. The fluid system blanket pressure, i.e., the pressure at the high point of the system, is maintained at a level such that the fluid vaporizes in the desired temperature operating range of the collector. The vapor collects in an accumulator that is connected in parallel in the heat transfer system with the collector. The accumulator serves to supply a regulated flow of vapor for motivating a vapor jet compressor-pump. The pump functions for the dual purposes of circulating the heat transfer fluid and as a vapor compressor for space cooling or the pumping of heat from the outside environment into the system to supplement the heat supplied by the collector.

1 Claim, 3 Drawing Sheets

THERMAL COOLING AND HEAT TRANSFER SYSTEM

BACKGROUND OF THE INVENTION

1. Field of the Invention

This invention relates to the collection and use of thermal energy such as solar energy for the purpose of cooling and heating a heat transfer medium.

2. Description of Prior Art

My previous patent, U.S. Pat. No. 4,270,522 issued June 2, 1981, discloses a heat transfer system wherein solar energy is absorbed in a solar collector and transferred to a remote location at a lower elevation than that of the collector by means of a fluid heat transfer medium. The fluid is motivated by a steam injector activated by vapor produced in the system by a portion of the solar energy. The system is self-regulating so that it has a capability for operating in an efficient range of collector temperatures despite variations in solar radiation. The sole purpose of this prior system is to transfer heat from the collector to the point-of-need discharge heat exchanger for space heating.

This new invention relates to the cooling and heating of a heat transfer medium involving vaporization of a portion of the fluid. Fluids in the vapor state have been used for the cooling of space. For instance a steam jet system using solar energy for cooling of space was investigated by W. P. Green in 1936 and the results reported in "Utilization of Solar Energy for Air Conditioning and Refrigeration in Florida" (Masters Thesis, College of Engineering, University of Florida). The results of the investigation indicated that the Coefficient of Performance was limited to low values hence solar cooling by means of steam jet was not practical.

The use of a steam jet for chilling water is described in an article by H. R. Havmyer in Chemical Engineering 1948, entitled "Do You Know Enough About Steam Jet Engineering?" More recently in the latest (8th edition) of Marks Standard Handbook for Engineers on page 19-10, there is a description of the current state of the art of cooling space by means of steam jets.

A paper describing the use of steam jets for pumping air at low pressures is published in the "Transactions of the American Society of Mechanical Engineers", 358, entitled, "Characteristics of the Steam Jet Vacuum Pump", by L. S. Harris and A. S. Fischer. The ASME article, written in November of 1948, presents technical data relating to the performance ad efficiencies of steam jet vacuum pumps.

Typical steam jet vapor pumps used in practice are motivated by a jet of steam which flows from a source to a receiver, said receiver being maintained at a lower pressure than the source by means of additional pumps, usually steam jet ejectors. Also, conventional mechanical pumps are needed for supplying cold water for condensing vapor discharged from the jet pump. Such steam jet systems as well as the usual absorption and vapor compression systems that use solar energy for the cooling of space are typical of the current state of the art with regards to their size and complexity, hence they are expensive both in regards to the initial cost and subsequent operation and maintenance.

Solar systems designed solely for heating space and hot water are similarly large and complex. For example, it is inferred from a most recent state of the art article in the ASME publication, "Mechanical Engineering", December 1983, entitled, "System Performance for the Supply of Solar Heat", by G. O. G. Lof and S. Karaki, that manufacturing cost of solar heating systems, exclusive of collectors, is rarely less than 80% of the total price, installed, of the solar water heater or space heating system. It is also noted in the same article that solar systems at research and development centers have performed about twice as well as systems installed in routine residential and commercial establishments. The difference being "----mainly due to the soundness of the design, the quality of the installation, and the extent of maintenance required and performed". This conclusion by the authors of this latest ASME article confirms the need for solar energy systems that satisfy the objectives of this present invention.

SUMMARY OF THE INVENTION

An object of this invention is to provide a thermal energy system for heating and cooling a fluid heat transfer medium, such as water, requiring no external source of energy for its operation other than that provided by the thermal energy source.

A further object of this invention is to provide a solar energy system for the heating and cooling of a fluid heat transfer medium, such as water, requireing no external source of energy for its operation other than that provided by the sun.

It is another objective of this invention to provide such a system which is also hermetically sealed, has no moving parts such as motors, pumps, controls, valves, or instrumentation, is self regulating, and is essentially maintenance-free.

Another object of this invention is to provide a reversible flow solar collector for implementing said cooling and heating functions.

It is another object of this invention to provide an expansion tank for serving as an evaporator, and as a container and pressurizer of excess fluid in the heat transfer system.

Yet another object of the invention is to provide a vapor jet compressor-pump which is to be used in conjunction with the reversible flow solar collector and evaporator for implementing the cooling and heating functions of this invention.

Still another object of this invention is to provide a heat storage and distribution system compatible with the solar collector and heat transfer system for the efficient distribution of useful heat for heating space and water.

Yet still another object of this invention is to provide a heat absorption heat exchanger and related cold storage means for use in conjunction with evaporator and jet compressor-pump functions of the cooling system.

Another object of this invention is to provide a cool air distribution system compatible with the cooling system.

It is also an objective to provide means for readily converting the cooling system of this invention to a heat pump system.

Finally, another object of this invention is to provide for two valves in the hermetically sealed system for adjusting the heat transfer system so as to obtain maximum cooling during hot weather and maximum temperatures for the fluid heat transfer medium during cold weather, and for permitting use of fluid heat transfer mediums such as the common refrigerants for operation of the systems of this invention at pressures higher than practical in the preferred embodiment of this invention which is normally below atmospheric pressure.

These and other objects are accomplished by means of the several systems of this invention. The primary system is a Thermal Solar Heat Collection and Transfer System consisting of a thermal energy source such as a solar collector, an accumulator, a vapor jet compressor-pump and an evaporator which also serves as an expansion tank. These components are connected in series to discharge heat exchangers at remote and possibly lower elevations where the collected heat is discharged for heating space, or alternately, a heat transfer medium such as water. The cooled effluent flowing from the cold fluid outlet of the discharge heat exchangers is returned to the upper elevation where it supplies the cold fluid feed requirements of the vapor jet compressor-pump. The discharge from the pump leads back to the solar collector to complete the heat transfer loop. The preferred embodiment of this invention uses water and its vapor as the fluid heat transfer medium hence water will be used as the reference fluid in the subsequent descriptions of the systems.

In greater detail, the system is initially filled with water to a height slightly above the bottom of the evaporator but above the remainder of the system. The system is then evacuated of all non-condensible gases and hermetically sealed. As the water in the collector heats, the vapor pressure increases to ultimately form vapor in the top of the collector which transfers heat by means of vapor condensation into the water at the top of the accumulator until it also develops a pocket of vapor at a pressure equal to the head of water above it in the cold evaporator. As heating continues the water levels in the collector and accumulator lower until and opening in the accumulator leading to the inlet vapor nozzle of the vapor jet compressor-pump is uncovered, permitting motive vapor to flow into the pump and activate it. The discharge from the activated compressor-pump leads back to the top of the solar collector. In the collector the cold fluid flows downward, opposite in direction to the initial flow of vapor. The heated water then flows from the bottom of the collector to an entrance near the bottom of the accmulator so as to continue to supply heat therein needed for producing steam for energizing the pump. The excess hot water not needed for generating steam, flows from the bottom of the accumulator to the lower discharge heat exchangers where useful heat is discharged and the cooled effluent returns to the cold feed water inlet of the pump. Motivated by low pump suction pressures, the feed water is directed into the path of the steam issuing from the accumulator an the steam condenses in the cold feed water to form a vacuum in the combining region of the steam and feed water. The steam from the accumulator expands into the low pressure of the combining region to reach supersonic velocities and a fraction of the related momentum in the steam is transferred to the feed water on impact. The momentum transfer motivates the mixture of feed water and condensed steam to produce the required forced convection for circulating the fluid throughout the heat transfer loop.

The self-regulation of flow is accomplished by means of several openings at various elevations between the top and bottom of the accumulator. If the flow of fluid through the collector is too low, the temperature of the effluent will continue to rise. As the related level in the accumulator continues to lower, more ports are uncovered to increase the supply of steam to the pump. This action in conjunction with the increased steam pressure at the lower water levels in the accumulator eventually results in an equilibrium condition being reached where the water flow down through the collector, the solar heat being absorbed therein, and the temperature are balance and in a state of equilibrium. The temperature at which equilibrium occurs is controlled by the head in the evaporator which can also contribute feedback to the system. This is accomplished by means of a desiged relation between the diameters of the accumulator and the evaporator. The volume of water expelled from the evaporator and collector as a result of the lowering of the water level must be accounted for by a corresponding increase in the volume of water in the evaporator. Hence, the smaller the evaporator diameter is in relation to the accumulator diameter the greater the increase in head imposed on the system will be. Conversely, when the evaporator diameter is very large with respect to the accumulator the effect will be small.

A second system of this invention is the Space Heating System which consists of a heat storage tank which surrounds the discharge heat exchanger. The storage tank in turn is enclosed in a thermally insulated housing. Air is circulated through the space between the storage tank and the housing where it absorbs heat from the storage tank surface. The heated air is distributed by conventional ductwork throughout the space to be heated.

A third system of this invention is a Water Heating System which consists simply of a hot water tank connected to the storage tank of the space heating system. A natural circulation loop transfers heat from the heat storage tank to the hot water tank. The fluid in the natural circulation loop is isolated from the water in the hot water tank by a heat exchanger, hence the hot water may be delivered at building supply pressures.

A fourth system of this invention is the Heat Pump System consisting of the evaporator, an absorption heat exchanger, and connecting lines to form a natural circulation loop for water between the evaporator and the heat exchanger. The system also includes a cold storage tank in which the absorption heat exchanger is inclosed, and a housing which incloses the cold storage tank so as to provide space for the circulation of air over the surface of the storage tank. Cold water produced in the evaporator flows downward through the colder connecting line and into the heat exchanger where heat is absorbed from the cold storage tank. The heated water rises in the warmer connecting line to be returned to the evaporator to supply the heat needed to continue evaporation at the constant design temperature. The resulting vapor is compressed by the vapor jet compressor-pump, joins the motivating flow of steam and the mixture impinges against the feed water to provide the aforesaid momentum needed for circulating the water in the primary system. The heat loss from the cold storage tank is replenished by means of warmer fluid from the outside environment which is circulated through the space between the storage tank and its enclosure. The chilled fluid is returned to the outside environment.

A fifth system of this invention is the Space Cooling System which is essentially the same as the Heat Pump System except that the warm fluid that is circulated between the space between the cold storage tank and its insulated enclosure is air withdrawn from the inside of the building. Also the cold air discharged from the enclosure is distributed throughout the space inside the building by means of ductwork similar to the Space Heating System. A portion of the space between the cold storage tank and the enclosure can also be reserved for the storage of perishable items that require refrigeration in order to preserve them. The enclosure is provided with an access door, similar to an ordinary household refrigerator.

The above summarizes the preferred embodiment of this invention which limits primary system operating pressures to those that can be practically achieved by the elevation of the evaporator-expansion tank. An alternate form of this invention includes a separate evaporator in which the fluid level is maintained by means of a float valve arrangement. With the separate evaporator and float valve in the primary system, the system operating pressures are not restricted since the higher pressure water supply from the system to the evaporator is controlled by the float valve. Hence, make up water from the high pressure system can be admitted into the evacuated evaporator while maintaining the required water level for facilitating evaporation.

In yet another alternate form of this invention, which relates to both the preferred embodiment and the alternate forms, a by-pass valve is used to stop forced convection through the collector and accumulator. Hence, the only means for heat transfer from the collector to the accumulator is by vaporization of water in the reversible flow collector such as occurred during the start up period. With the by-pass valve open, therefore, all the heat absorbed by the collector produces steam which will provide maximal evaporation of the fluid in the evaporator and related cooling of space. Hence, during cold weather the by-pass is closed and when it is hot the by-pass valve is opened for maximal cooling.

It will be appreciated that all the energy in the steam used by the jet compressor-pump is returned to the Solar Heat Collection and Transfer System in the form of heat. Hence, any fraction of this heat that is not discharged by the system for useful purposes is returned to the solar collector for recycling at higher temperatures.

DESCRIPTION OF THE PREFERRED EMBODIMENT

The use of water and its vapor in the preferred embodiment of this invention is for exemplary purposes only and it is to be understood that other suitable fluid heat transfer mediums such as alcohol or refrigerants may be used.

Similarly, the use of solar energy in the preferred embodiment of this invention is for exemplary purposes only and it is to be understood that other energy sources such as heat rejected from internal combustion engines may be used.

The detailed description of the functions of this invention is presented in the following order:
(1) Solar Heat Collection and Transfer
(2) Space Heating
(3) Water Heating
(4) Heat Pumping
(5) Space Cooling 1. Solar Heat Collection and Transfer Function.

Figure 1:
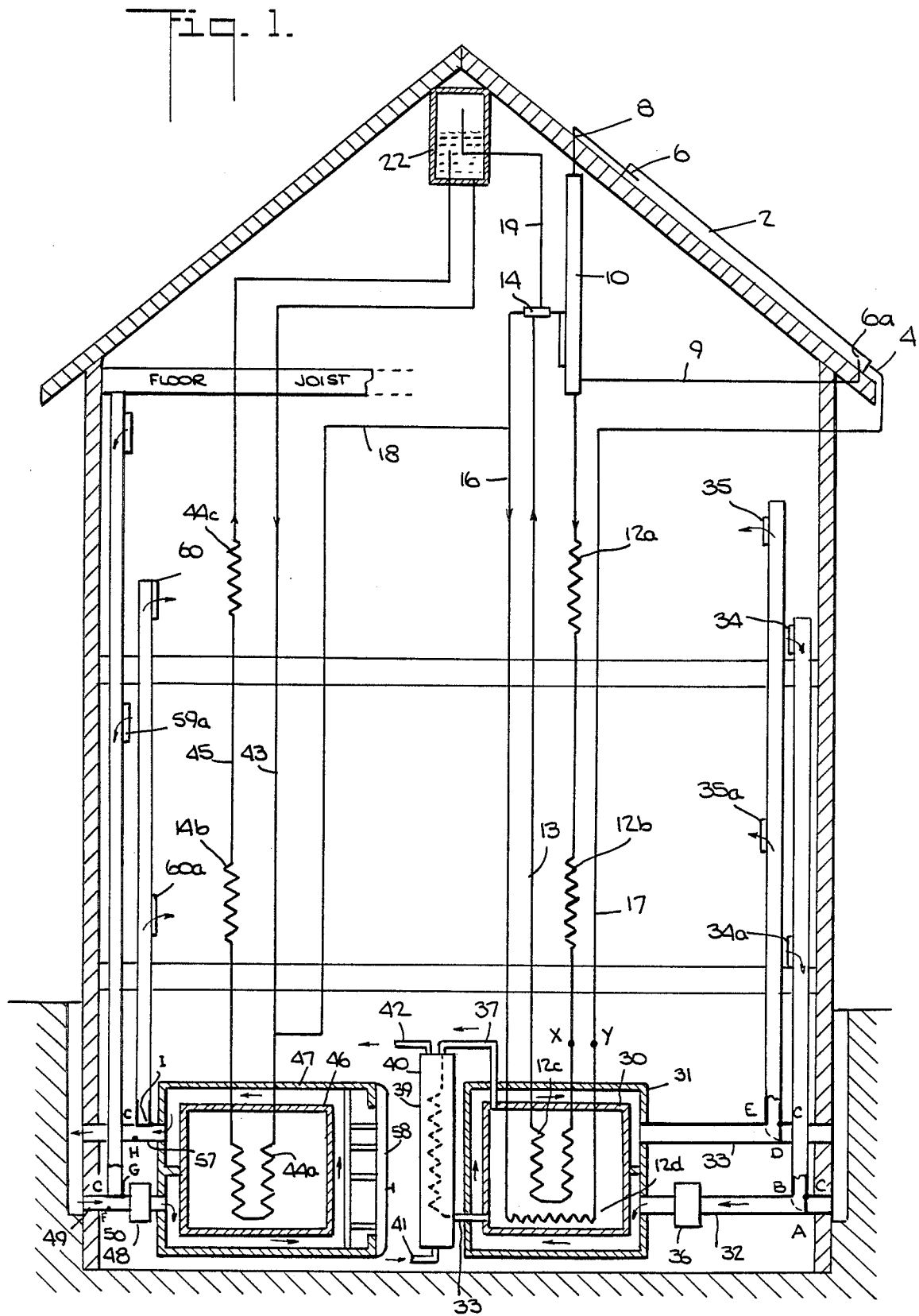
FIG. 1 is a schematic diagram of the preferred embodiment of the system of this invention represented in its environment in a house or other building.
Figure 2:
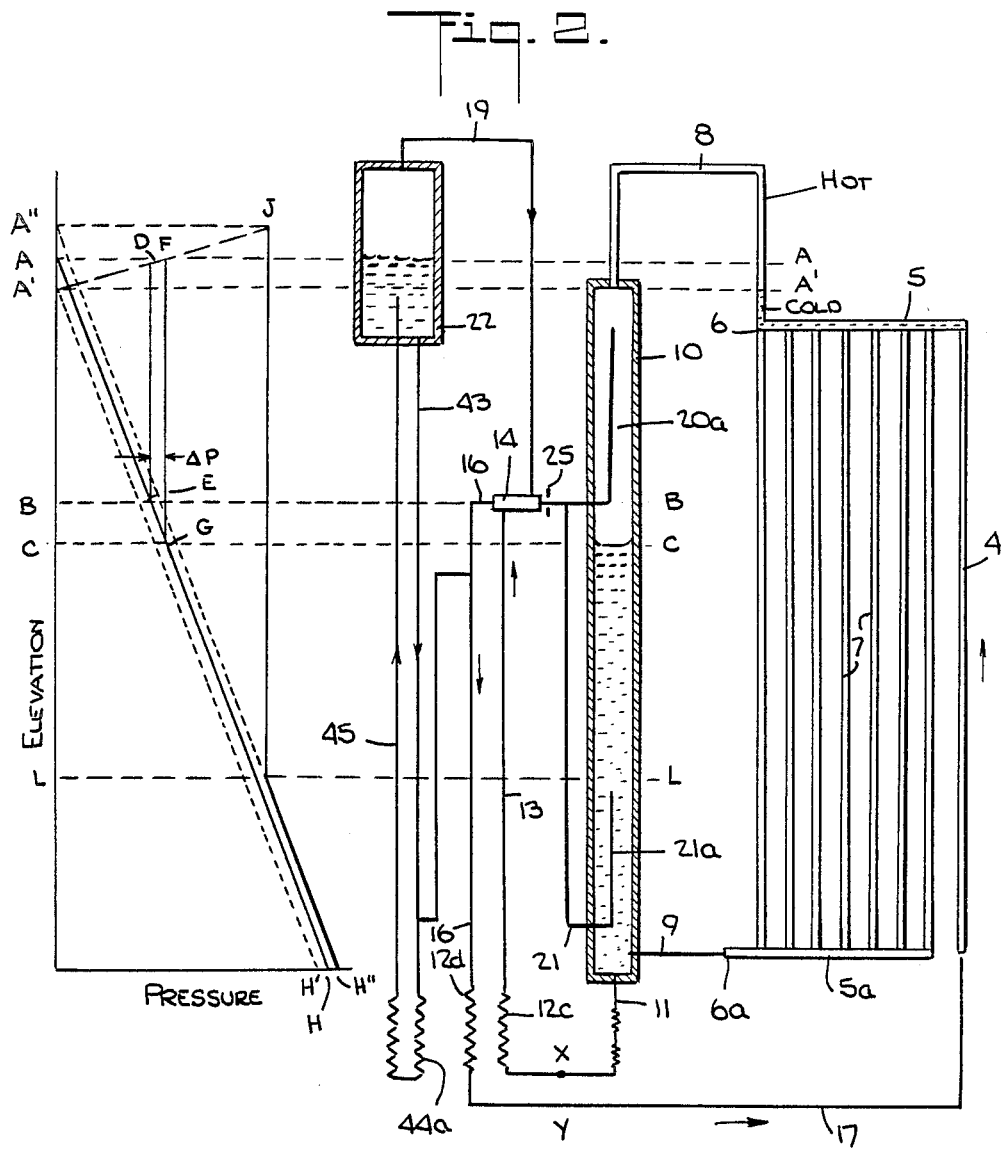
FIG. 2 is a more detailed schematic diagram of the fluid systems of FIG. 1 showing significant relationships between system elevation and the inherent self-regulation and control of the flow of the heat transfer medium.

Referring to FIG. 1, the system is shown in relation to a building in which it serves as source of useful heat. A solar energy collector 2, the energy source of the system, is shown mounted on the roof in an advantageous position to receive sunlight. While the ultimate source of energy to the system is the sun, the term "energy source" is also used herein in the thermodynamic sense, indicating the hot body within the thermodynamic cycle. Collector 2 is a conduit for the fluid heat transfer medium, such as water, and includes a collector inlet line 4 for supplying cold water, and vapor outlet 6. Collector vapor outlet 6 is connected to one end of a hot trap line 8 which extends to a vapor inlet to accumulator 10 at its top. Normally, when the collector is operating in the forced circulation mode of the preferred embodiment, the lower portion of hot trap line 8 is filled with water. Collector hot liquid outlet 6a is shown located near the base of collector 2 and is connected to the bottom portion of accumulator 10 by means of accumulator return line 9. Accumulator 10, among other things, is a tank to hold a volume of water and vapor and is located in an upper part of the building at about the same elevation as is the solar collector. Referring now to FIG. 2, the front view of the collector reveals that the collector cold liquid inlet line 4 extends to collector top header 5 which is connected to bottom header 5a by means of a plurality of collector fluid channels 7 containing water for absorbing solar energy during its passage downward through the channels. The heated water enters collector bottom header 5a, thence, through outlet 6a and line 9 into accumulator 10.

The direction of fluid flow through the first heat transfer loop associated with the collector and accumulator is now described with reference to FIG. 1. Hot water line 11 leads from the bottom of the accumulator 10 through a series of discharge heat exchangers 12a, 12b, and 12c, thence through pump cold feed water line 13 on through compressor-pump 14, pump discharge line 16, on through a fourth discharge heat exchanger 12d, return line 17 to the collector inlet line 4; then, turning again to FIG. 2, into collector top header 5, on down through collector channels 7, into collector bottom header 5a, and, thence, back to accumulator 10 by means of collector bottom hot liquid outlet 6a and accumulator return line 9 to complete the heat transfer loop. Hence, heat is absorbed by collector 2, transferred to accumulator 10 to heat the water therein, discharged from the bottom of the accumulator where the hot water flows to remote regions of the building where useful heat is discharged and the cooled water returned to the compressor-pump which returns it to the top of the collector for reheating in the next cycle.

The heat transfer system also shares use of some of the components used by the heat pump and space cooling systems. Referring again to FIG. 1, cold trap line 18 is shown connected to compressor-pump discharge line 16 in the upper region of the building and to evaporator line 43 at the other end located in the lower region of the building. The purpose of cold trap line 18, among other things, is to connect the heat transfer system to evaporator 22 which serves as an expansion tank for the heat transfer system as well as an evaporator for the heat pump and space cooling systems. A second connection occurs between compressor-pump 14 and evaporator 22 which are joined by vapor line 19. Connecting vapor line 19 relates to the heat pump and space cooling systems only and will be included in the description of these systems.

The inherent self-regulating features of the preferred embodiment of the solar heat collection and transfer system are now described. Referring yet again to FIG. 2, the relative elevations of the system components to one another relate to the operation and regulation of the heat transfer system. System elevations are, therefore, plotted on the left of FIG. 2 as a function of pressure so as to provide a clear appreciation of the control and regulation features of the heat transfer system. Throughout the description the terms, head, h, and pressure, p, are used interchangeably. Head is defined as the vertical distance in feet to the surface of the water in the evaporator above the level of interest, and the corresponing pressure, p, is about 0.433 times h, where p is expressed in units of pounds (force) per a square inch of area absolute (psia).

The system is initially filled with cold water to level A' shown on FIG. 2, evacuated so as to remove all non-condensible gases, and then hermetically sealed so as to retain the vacuum. For these conditions, the pressure in the system as a function of elevation is indicated by the dashed line A'H' on the adjacent plot on FIG. 2. Next, as collector 2 is heated by solar radiation, the vapor pressure in the collector increases causing the water therein to boil at a temperature corresponding to the pressure plotted to the left of FIG. 2 according to pressure-temperature relationships found in standard tables listing the thermodynamic properties of water and steam. As heating of collector 2 continues, steam enters upper header 5 and flows through vapor outlet 6, hot trap line 8, and on into the vapor inlet to the top of accumulator 10 to condense in the top layer of water therein. As heating continues further, the vapor pressure of the water in the accumulator increases correspondingly until it reaches about the same value of that in the collector. When said vapor pressures exceed the pressure exerted by the fluid depicted by line A'H' on the plot of FIG. 2, a pocket of steam will begin to grow at the top of accumulator 10 and the displaced water will be discharged through a hot liquid outlet at the bottom of accumulator 10 into hot water line 11, discharge heat exchangers 12, cold feed water line 13, pump discharge line 16, on into cold trap line 18, thence into evaporator cold line 43 and then into evaporator 22. A parallel flow will also take place from the inside of the accumulator, through stabilizer lines 20a and 21a, steam lines 20 and 21, compressor-pump 14, pump discharge line 16 to join the flow from the bottom of accumulator 10 to the evaporator. A third path for the displaced water occurs from the bottom of the collector, bottom header outlet 6a and line 9 to join the flow of water displaced from the accumulator. Since the steam is relatively weightless compared to water, the pressure of steam is independent of elevation, hence, is essentially uniform along the length of the accumulator that it occupies as illustrated by the plot on FIG. 2. The plot also indicates that when the steam-water interface in accumulator 10 lowers to elevation "C", the steam pressure will be greater than the pressure in the water filled lines at all elevations above level "C". For this condition, the excess steam pressure in the accumulator will empty stabilizer line 20a, vapor outlet line 20, and orifice 25 at level "B" and steam will enter and activate the vapor jet compressor-pump 14. The situation at this time is depicted again on the plot of FIG. 2 which shows that the evaporator water level has increased from A' to A and the associated pressure in the water filled lines is AH. The pressure distribution in the accumulator is represented by line FGH, and at level "B" the steam pressure in line 20 exceeds the pressure of the water in the pump by $\Delta p$. Hence steam begins to flow through line 20 to activate the compressor-pump. At this point in time the discharge pressure, $h_p$ imposed at the pump outlet is equal to head AB and the higher motivating steam pressure is equal to head AC. As the motivating steam expands through the vapor nozzle of the vapor jet compressor-pump 14 it impacts the cold feed water entering through line 13 and the pressure in the combining tube drops to the saturation pressure associated with the combining tube temperature. At the low discharge head, $h_p$ normally available in the preferred embodiment of this invention, which is assumed to be in a range of 4 to 10 feet head, the combining tube temperature is expected to be only a few degrees above the cold feed water temperature, hence the combining tube pressure will be equivalent to a head of less than 2 feet of water. For example, if the cold feed water temperature is 90 degrees Fahrenheit, and after being impacted by and condensing the steam in the combining tube of the vapor jet compressor-pump, the temperature of the mixture of condensed steam and feed water is 97 degrees F, the pressure in said combining tube, according to published tables listing the thermodynamic properties of steam and water, is 0.867 psia, which is equivalent to 2 feet of water head. For these conditions, the pressure load to be supplied by the vapor jet compressor-pump operating in the aforesaid discharge pressure range of values for $h_p$ is in a range of 2–8 feet. These data illustrate the advantage of operating the vapor jet compressor-pump at pressures below atmospheric. For instance, if evaporator 22 is raised to atmospheric pressure, which is equivalent to 34 feet head, the pressure load on the pump will increase to a range of 36 to 42 feet of water. Hence, for the same flow conditions, more energy must be supplied by the motivating steam when the system is operating at the higher pressure, resulting in relatively higher compressor-pump discharge temperatures.

At the moment the pump begins to operate, it produces a discharge pressure head, $h_p = AC$ as indicated on FIG. 2, said pressure being sufficient to return the water to about level "A" in hot trap line 8. Top collector header 5, however, is at a lower elevation than level "A", hence, water discharged from the pump will now enter the return lines of the heat transfer loop, on through the cold liquid inlet line 4 into top collector header 5. No flow can occur through hot trap line 8 because it extends above level "A", the highest possible liquid level in the system, therefore, the fluid in the header flows downward through collector channels 7 into bottom collector header 5a, hot liquid outlet 6a, on through line 9 into accumulator 10. The heated water, motivated by the low pump suction pressure of 2 feet, then flows through the aforesaid heat transfer loop, discharge heat exchanger 12c and line 13 which supplies the cooled feed water to vapor jet compressor-pump 14.

It is well known to those skilled in the art that it is desirable to regulate the flow of the heat transfer medium in the heat transfer system so that the heated fluid leaving the collector falls into a narrow band of temperatures that is neither lower or higher than necessary. Temperatures that are too low may result in the solar heat being unavailable for useful purposes, and on the other hand higher than necessary temperatures result in a loss of flat plate collector efficiency. It is, therefore, important to control and regulate the flow of the heat transfer fluid in order to collect maximal useful heat. This is accomplished in the heat transfer system of this invention by means of accumulator 10 and the relative configurations of evaporator 22 and accumulator 10. For example, if the level in the accumulator continues to lower after the pump is activated at level "C" FIG. 2, the motivating steam pressure will increase as can be seen by referring to the plotted data. The increased forced circulation through the collector caused by the higher motivating steam pressure to the compressor-pump will retard the rate of temperature rise in the collector until an equilibrium condition between flow and temperature is reached at a lower level in the accumulator. Assuming that the lower level now is at level "L", the pressure distribution for the equilibrium condition at level "L" is depicted by line JKH". A comparison with the pressure condition at the initial level "C" indicates that the discharge pressure head of the pump, $h_p$ has increased from $h_p=(D-B)$ feet to (J-B) feet and the motivating steam pressure from (F-G) to (J-K) feet. It will now be apparent that the sensitivity of the flow response to collector temperature change is a function of the relative sizes of the accumulator and evaporator. Again, for example, if the evaporator has a diameter one half that of the accumulator, a change in accumulator level of one foot results in a four foot change in the evaporator. As can be seen from FIG. 2, an increase in evaporator level will cause an identical increase in pump discharge pressure which affects the rate of flow in the heat transfer system. Hence, the response of the system to temperature changes can be controlled by the relative configurations of the accumulator and the evaporator to provide the system with an inherent capability for adjusting flow to maintain temperatures in a desired range of values.

As disclosed in my U.S. Pat. No. 4,270,522 there is yet another means for controlling and regulating the flow of the heat transfer fluid in the system, the description which is repeated herein for the sake of completeness. Referring again to FIG. 2, when the pump is operating with the water level at level "C", for instance, the motivating steam in the accumulator enters through the top of the vertical stabilizer line 20a, passes through orifice 25 into line 20 and on into the vapor jet compressor-pump 14. Orifice 25 restricts the steam flow, hence, the discharge flow is less than it would be if the steam supply line was unrestricted. If the flow of the heat transfer fluid is inadequate and the temperature in the collector continues to rise, the level in the accumulator will drop below line 21 and the steam will now enter unrestricted line 21 to increase the supply of steam to the pump so as to reach an equilibrium condition. The purpose of the vertical stabilizer line, 21a is to delay cut-off of the steam supply during a cooling period such as when the collector is shaded by a passing cloud. For instance, as the collector cools the level in the accumulator will rise but the supply of unrestricted steam to the pump will not be stopped until the level rises to the top of stabilizer line 21a. If desirable, additional lines similar to 20 and 21 may be installed so as to make flow changes more often and less abrupt. Furthermore, a second compressor-pump may be installed in parallel with the first compressor-pump to provide additional pumping energy. Since both pumps discharge to the same pressure head they will share the pump load according to their designed capacity and steam supply.

2. Space Heating Function.

Referring again to FIG. 1, discharge heat exchanger 12c and 12d are shown enclosed in heat storage tank 30 which is filled with a heat storage material such as water. Heat storage tank 30 is in turn enclosed in thermally insulated housing 31. A fluid such as air is circulated in the space between the heat storage tank and housing 31 where there is a demand for space heating. Operation in the space heating mode of this invention requires that dampers CAB in cold air supply duct 32 and CED in hot air supply duct 33 are to be aligned respectively in the CA and CD positions as shown on FIG. 1. Space heating is accomplished by the withdrawal of unheated air from the building through cold air duct ports 34 and 34a into cold air duct 32, motivating blower 36 and into housing 31 where it is heated by the enclosed storage tank 30. The heated air is discharged through hot air duct 33 and discharge ports 35 and 35a by means of ductwork similar to that used in a conventional forced convection heating system. It is to be understood that natural convection can be substituted for the forced convection. FIG. 1 also displays additional discharge heat exchangers 12a and 12b which provide alternate means for heating the upper regions of the building.

3. Water Heating Function.

A hot water supply is provided by a natural convection system comprising hot water hot line 37 connected to the upper portion of heat storage tank 30 and hot water cold line 38 connected to the lower portion of the heat storage tank. Hot water heat exchanger 39 connects the ends of the hot water line 37 and cold water line 38 to form a continuous natural circulation loop consisting of the hot line 37, heat exchanger 39, cold line 38 and a path through heat storage tank 30 from the lower cold line connection to the upper hot line connection. Heat exchanger 39 is enclosed in hot water supply tank 40 connected to the building water supply at inlet 41. The building's hot water distribution system is connected to outlet 42 of hot water tank 40. Hence, heat is transferred from storage tank 30 by natural circulation to heat exchanger 39 which heats water at building supply pressure for distribution throughout the building.

4. Heat Pump Function.

Referring again to FIG. 2, evaporator 22 is shown connected to the vapor jet compressor-pump 14 which serves to evacuate evaporator 22 and also to circulate the heat transfer fluid around the entire thermal heat collection and transfer system. The water level in the evaporator is shown to be at level "A" and the region above level "A" is evacuated of all non-condensible gases. A second heat transfer loop leads from the cold fluid outlet in the lower portion of the evaporator through cold water line 43 to connect to the cold fluid inlet of absorption heat exchanger 44a and on through exchanger 44a and its hot fluid outlet into return hot fluid line 45 which terminates at a hot fluid outlet in the upper portion of evaporator 22 but below the controlled water level therein.

Referring again to FIG. 1, the absorption heat exchanger 44a is located inside cold storage tank 46. Tank 46 is filled with a cold storage material such as water. Cold storage tank 46 is in turn enclosed inside thermally insulated housing 47 so as to provide space between tank 46 and housing 47 for the circulation of air. Air, motivated by blower 48, is withdrawn from the outside of the building through outside air port 49 on through hot air inlet duct 50, into the space between housing 47 and cold storage tank 46. The air cooled by absorption heat exchanger 44a exits from housing 46 into cold air outlet duct 51 and is returned to the outside through cold air outlet port 52. When the system is operating in the heat pumping mode, damper CFG in hot air inlet duct 50 and damper CHI in cold air outlet duct 51 are respectively in the CG and CI positions as shown in FIG. 1.

The latent heat in the vapor from evaporator 22 as well as that in the motive steam is released as it condenses in the feedwater to the compressor-pump. The heated effluent is transferred by means of line 16 and discharge heat exchanger 12d to the fluid in heat storage tank 30. Excess heat is discharged to the outside by aligning dampers CAB and CDE respectively in the CB and CE positions.

The heat pump function is to extract thermal energy from the outside environment for supplementing the solar energy supplied by collector 2. This is accomplished by circulating outside air through housing 47 when the outside air temperature is less than the temperature inside the building but greater than the temperature of the absorption heat exchanger 44a. When this temperature condition exists, the fluid in the absorption heat exchanger is heated by the outside air and the heated fluid is delivered to evaporator 22 by means of natural convection. The vapor produced by the heat absorbed from the outside air is compressed by vapor jet compressor-pump 14 and delivered to the thermal heat collection and transfer system to supplement the heat received from solar collector 2.

Figure 3:
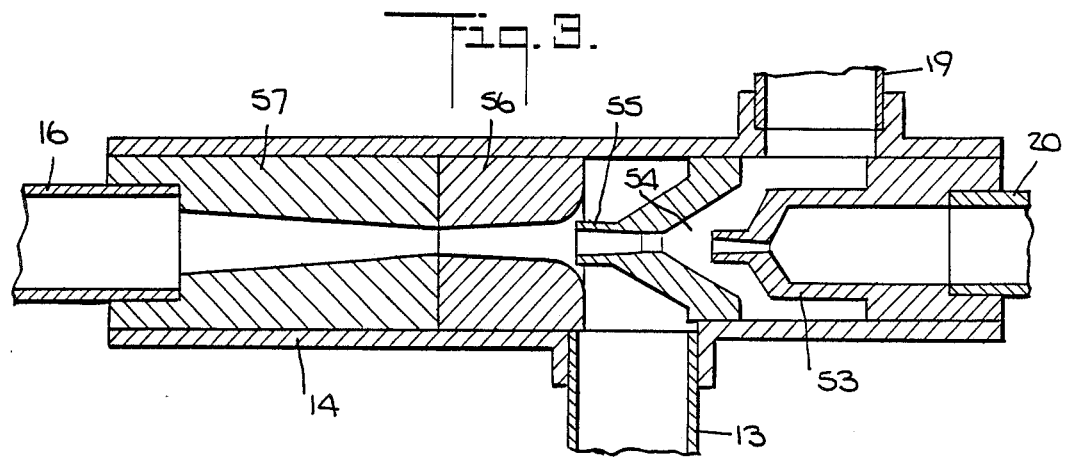
FIG. 3 is a sectional view of the vapor jet compressor-pump which motivates the fluid in the heating and cooling systems.

The heat pump system is motivated by vapor jet compressor-pump 14 shown in a sectional view on FIG. 3. Motive vapor from accumulator 10 enters through compressor-pump vapor supply line 20 into vapor nozzle 53, expands in the diverging section, exits at the vapor nozzle outlet at supersonic velocities and jets across first combining region 54. Region 54 is connected to the upper portion of the evaporator 22 by means of vapor line 19 through which vapor flows from the top of evaporator 22 into region 54. As the jet from vapor nozzle 53 traverses region 54, it entrains at its boundaries vapor from evaporator 22 and the mixture of motive steam and entrained vapor passes through injector vapor nozzle 55 into a second combining region in combining tube 56 to impinge against and condense into the cold feed water entering through the fluid inlet of the compressor-pump from pump cold feed water line 13. At impact some of the momentum of the motive steam and vapor is transferred to the mixture of condensed steam and feed water in combining tube 56. The momentum is manifested in the form of relatively high water velocities in combining tube 56 which is normally in the aforesaid pressure range of one to two psia. The water is deaccelerated in diffuser 57 to reach the discharge pressure, $h_p$ needed for discharge of the water from the compressor-pump outlet and circulation of the water throughout the thermal heat collection and transfer system.

5. Space Cooling Function.

The system used for space cooling is essentially the same as the heat pump system described heretofore, except that the damper positions are reversed so that the supply of air for circulation through housing 47 is withdrawn from and discharged to the outside of the building and inside air is circulated through housing 47 where it is cooled and discharged back into the building. This is accomplished by realigning the dampers shown on FIG. 1 from the heat pump positions CA, CD, CG and CI to positions CB, CE, CF and CH. The heated air is then drawn into hot air duct ports 59 and 59a, circulated through the space between cold storage tank 46 and housing 47 so as to be cooled by tank 46 and then discharged through cold air duct 51 and cold air duct ports 60 and 60a to cool space in the building. Absorption heat exchangers 44b and 44c in line 45 furnish separate means for cooling space in the building.

A refrigeration function is provided by housing 47 and access door 58.

An alternate flow path for the fluid heat transfer medium for providing maximal heat pump performance and space cooling is now described. A by-pass line is installed in the heat transfer system connecting hot water line 11 to return line 17 at points X and Y shown on FIG. 2. The by-pass eliminates forced circulation through collector 2, hence, the water level in the collector will lower to about the same level as that in the accumulator 10. The heat absorbed by the collector will ultimately be represented in vapor which flows upward into collector top header 5, outlet 6, into hot trap line 8 and so on into the top of accumulator 10. Make up water to take the place of the evaporated water will flow up through hot fluid line 11 in a direction opposite to the previous forced convection direction of flow, into the bottom of accumulator 10 and also into line 9 to collector bottom outlet, 6a, on into collector bottom header and then into collector channels 7. Hence, with the by-pass line in place, the flow of fluid through the accumulator and the collector is in the reverse direction to that of the forced convection mode of circulation and the collected solar energy is used to produce steam. The discharge from the compressor-pump, with the exception of the make-up water, is circulated by forced convection through a smaller heat transfer loop comprising compressor-pump discharge line 16, discharge heat exchanger 12d, by-pass line XY, discharge heat exchanger 12c and compressor-pump cold feed water line 13 to be returned to compressor-pump 14 to complete the loop. This alternate system provides maximal cooling since all the solar energy is used to produce steam for motivating the space cooling or heat pump systems. The maximal temperature of the fluid in the discharge heat exchangers, however, is less than that produced in the forced convection mode since the steam is the only means of heat transfer from the collector into the system and its temperature is degraded when it condenses in the cold feed water. Therefore, the discharge heat exchanger temperatures, when the system is used for heating, with a by-pass between X and Y, will not be as high as provided by the preferred embodiment of this invention. However, if the objective of the preferred embodiment for having no moving parts is waived, a packless diaphragm valve or equivalent can be inserted between points X and Y, then the valve can be shut to provide maximal temperatures for space heating and open for maximal cooling. Furthermore, when in the cooling mode of operation, the valve can be partially shut so as to raise the level of the water in the collector, if desired, for preventing overheating of the upper portions of the collector if the water level is too low.

Another alternate form of this invention relates to high temperature operation such as provided by concentrating collectors or exhaust gases from internal combustion engines. For instance, if water is used as a heat transfer medium and the system is operating at 212 degrees Fahrenheit, the evaporator must be elevated about 34 feet above the accumulator in order to achieve the required vacuum therein for evaporating and chilling the water. The design solution for this problem is to provide a separate expansion tank which can be installed at a lower elevation than in the foregoing example. A non-condensible gas blanket at about atmospheric pressure is used in the expansion tank as a substitute for the head provided by elevation and the separate evaporator containing a float valve arrangement supplies the requirements of the evaporator of the preferred embodiment.

Figure 4:
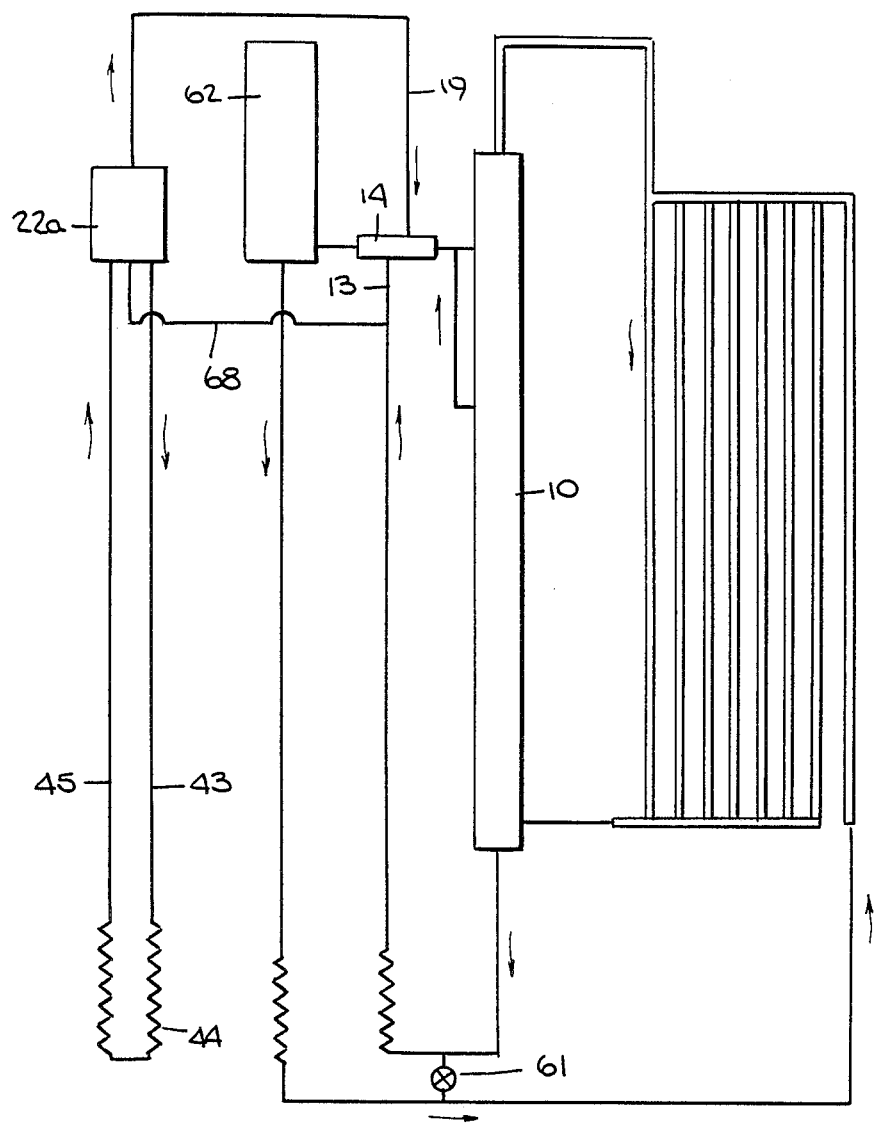
FIG. 4 is a schematic diagram of an alternate embodiment of the invention in which its primary heat collection and transfer system operates at higher pressures than in the preferred embodiment.
Figure 5:
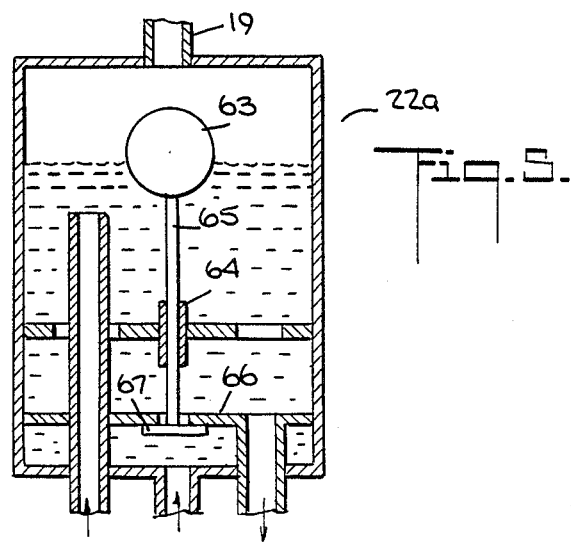
FIG. 5 is a sectional view of the evaporator used in the alternate embodiment.

FIG. 4 illustrates the alternate high pressure system which is essentially the same as the preferred embodiment shown on FIG. 2 except for the addition of expansion tank 62, aforesaid by-pass valve 61 and evaporator 22a. Expansion tank 62 is initially pressurized to the desired pressure and hermetically sealed. If maximum temperatures are desired, by-pass valve 61 is closed. When the collector has raised the temperature of the water sufficiently, a vapor pocket will appear in the accumulator as previously described and continue to grow until the vapor jet compressor-pump 14 is activated. The forced convection resulting from compressor-pump activation will be in the direction indicated by the arrows on FIG. 4. As previously described, the steam jet compressor-pump 14 reduces the pressure in the compressor-pump so as to draw a vacuum in line 19. Water and vapor will, therefore, be withdrawn from line 19 and evaporator 22a, however, water flow into the system is prevented by the float valve arrangement shown on FIG. 5. FIG. 5 is a sectional view of evaporator 22a which is attached to vapor jet compressor-pump 14 by means of vapor line 19. As evaporation from tank 22a continues, float 63 guided by sleeve 64 around linkage 65, lowers so as to produce an opening between valve seat 66 and valve 67. Referring again to FIG. 4, water from pump cold feed line 13 flows through evaporator water make-up line 68 to the bottom of the evaporator. Returning again to FIG. 5, the make up water flows between valve 67 and valve seat 66 to enter the evaporator until the water level is raised sufficiently so that, by the action of the float and linkage, the valve closes against its seat to shut off the supply of make up water. Hence, the required vacuum is maintained in the evaporator.

The absorption heat exchanger 44 is provided with chilled water by natural convection through lines 43 and 45 as described previously.

Such high pressure systems are adaptable for use in motor vehicles. For instance, a vehicle consuming four gallons of fuel per an hour normally rejects more than 120,000 BTU/hour of heat in the exhaust gases. This heat rate is equivalent to that absorbed by about 500 square feet of solar collectors. Calculations indicate that this invention can produce more than one ton of refrigeration with such a heat supply. Furthermore, the compact unitized design satisfies space requirements imposed by vehicles.

It will be appreciated that the foregoing dimensions, materials and arrangements are intended to be exemplary only, and those skilled in the art may determine other dimensions, materials and arrangements within the scope of this invention.

In addition, while the preferred embodiments of the invention have been shown and described, changes, additions, and substitutions of equivalent components can be made without departing from the spirit and scope of the invention.

I claim:

1. Heat transfer apparatus, comprising:
   a first fluid inlet for introducing heated vapor heat transfer medium;
   a second fluid inlet for introducing a second saturated vapor heat transfer medium;
   a third fluid inlet for introducing liquid heat transfer medium;
   a first nozzle for expanding the heated vapor heat transfer medium and entraining the second vapor heat transfer medium, having a first nozzle inlet in communication with the first fluid inlet and having a first nozzle outlet in communication with the second fluid inlet;
   a second nozzle for expanding the heated vapor heat transfer medium and the second vapor heat transfer medium and for entraining the liquid heat transfer medium, having a second nozzle inlet in communication with the first nozzle outlet and a second nozzle outlet in communication with the third fluid inlet;
   a first combining region disposed between the first nozzle outlet and the second nozzle inlet for combining the heated vapor heat transfer medium and the second vapor heat transfer medium;
   a second combining region disposed after the second nozzle outlet for combining the heated and second vapor heat transfer mediums and the liquid heat transfer medium;
   means for decelerating the fluid issuing from the second combining region, wherein the decelerating means comprises a diffuser section longer than the length of the second combining region.

* * * * *